United States Patent Office 3,246,138
Patented Apr. 12, 1966

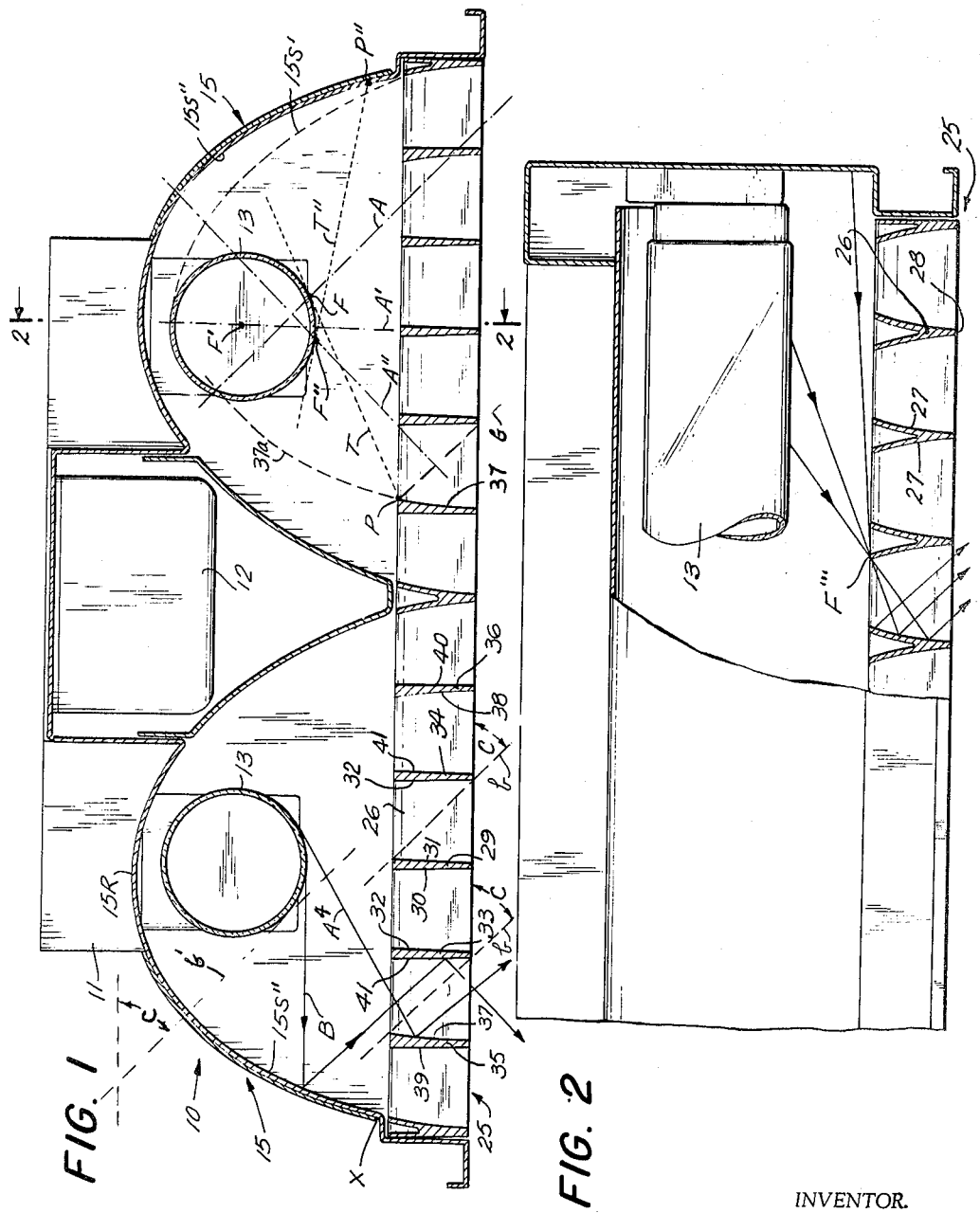

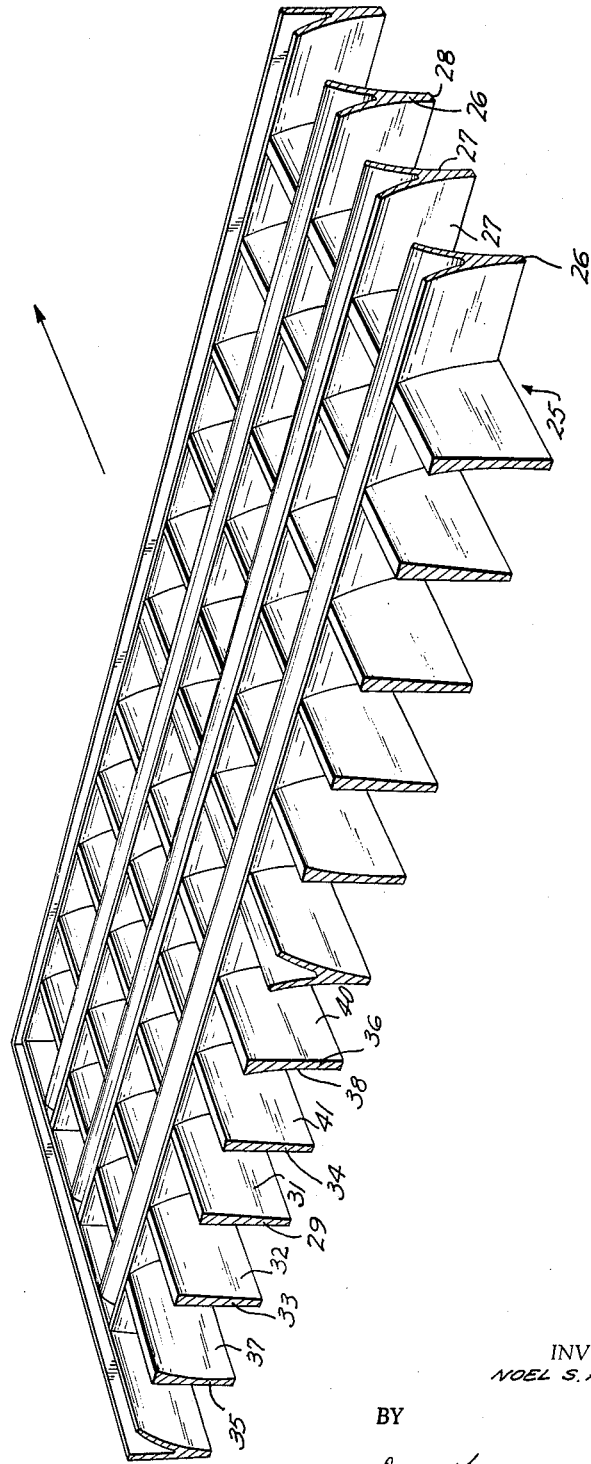

3,246,138
LOW BRIGHTNESS LOUVER FOR
LIGHTING FIXTURE
Noel S. Florence, Cranford, N.J., assignor to Lightolier Incorporated, Jersey City, N.J., a corporation of New York
Filed June 11, 1963, Ser. No. 287,010
9 Claims. (Cl. 240—51.11)

This invention relates to the art of lighting fixtures, more particularly to a substantially specular louver and reflector for minimizing direct glare from a light source such as, for example, a fluorescent tube, yet providing a high level of illumination.

As conducive to an understanding of the invention, it is noted that direct gare from a light source to the eyes of an occupant of a lighted area will impede vision by competing with reflected light from the object or area to be illuminated and upon which the eyes are focused.

For this reason good quality lighting fixtures are provided with suitable means to reduce such direct glare. This may be a diffuser which spreads the source light emission over a larger area thus reducing the brightness; it may be a lens which directs more of the light emission downward or it may be a louver which obscures a direct view of the source of light and the reflecting cavity when viewed from normal viewing angles, i.e., inside a preselected cutoff angle.

This normal cutoff angle is measured between the plane of the light emitting surface of the light fixture and the line along which direct rays of light from the source are barely perceptible. For overhead lighting fixtures, this cutoff angle is usually selected in a range between 25 and 55 degrees, depending upon the parameters of the room, this angle being empirically determined to provide minimal direct perception of the light source by the occupants of a typical illuminated area, yet with maximum efficiency of the unit, i.e, maximum illumination of the area.

Where a louver is used to provide illumination with minimum direct glare, if inter-reflection of light occurs between the blade surfaces of the louver, which produces an undesired brightness of the louver itself, uncomfortable direct glare will be created, even though a direct view of the light source may be blocked at angles from horizontal less than the cutoff angle.

To obviate such inter-surface glare, the blades of the louver have in some instances been made with a specular surface, i.e, a mirrored surface and contoured so as to insure the reflection of light therefrom along desired paths. Thus, in U.S. Patent No. 2,971,083, it has been proposed to curve the specular surfaces of the cell walls of a grid comprising the louver, with a contour such that any reflection from these curved cell surfaces will be at an angle from the exposed surface of the louver greater than the desired cutoff angle. In curving the cell wall surface to obtain desired optical effects, where the cell walls are thickened at the top thereby reducing the open area of the top of the cells there results substantial diminution of efficiency of light transmission through the louver.

It is accordingly among the objects of the invention to provide an improved lighting fixture of minimum height for distributing light from a light source to an illuminated area with a high degree of efficiency, i.e., with a minimum reduction of light intensity on the illuminated area, yet with a minimum of direct glare.

According to the invention, the lighting fixture comprises a louver having a grid of cells adapted to be positioned with one of the open faces of the cells exposed to the light source, while the opposed open faces of the cells face the illuminated area. The louver is designed for use in connection with an elongated light source, illustratively shown as a fluorescent tube housed in a specially shaped reflector.

The cells of the louver are formed by spaced parallel longitudinal baffles which have a specular surface and which extend in a direction substantially parallel to the axis of the light source, with intersecting spaced parallel baffles also having a specular surface which extend in direction substantially transversely of the light source so that such baffles extend substantially at right angles to each other. The transverse baffles of the louvers are formed with a surface having an optical curvature with a focus approximately at the top of the next adjacent transverse baffle on the same side, and more particularly the walls of the transverse baffles are formed with a parabolic curvature, the focus of the parabola of any one wall lying substantially at the top of the next facing transverse wall, and the axis extending along a line outside the desired cutoff angle.

According to one illustrative embodiment of the invention, the longitudinal baffles are formed so that those surfaces of the baffle accessible to direct impingement of light from the light source will reflect the light rays at an angle from the horizontal equal to or greater than the desired cutoff angle, and more particularly are either provided with an optical curvature having an axis inclined at an angle equal to or greater than the cutoff angle and having a focus substantially at the point of tangency of a line drawn from the top edge of the curved baffle and tangent to the lower portion of the tubular light source, or are planar and arranged to extend in a direction substantially perpendicular to the plane of the bottom surface of the louver. The surfaces of the longitudinal walls not adapted for direct impingement of light from the light source are substantially planar or flat and arranged to extend in a direction substantially perpendicular to the plane of the bottom surface of the louver.

However, since these planar surfaces face the reflecting cavity of the fixture, the random reflections of a diffuse reflecting cavity would cause some rays to impinge on the planar faces of the longitudinal louver blades at an angle from the horizontal smaller than the cutoff angle. These rays would therefore be reflected by the blades at the same angle which would be within the cutoff zone and would interfere with the low brightness characteristic of the unit.

To avoid this, at least a portion of the reflector housing the light source is made specular, and curved so that the light reflected therefrom to the planar louver surfaces will impinge on these planar surfaces at an angle to the horizontal greater than the desired cutoff angle.

By reducing the number and the curvature of the curved surfaces of the longitudinal walls subject to direct impingement of rays from the light source and by eliminating the optical curvature of the longitudinal walls, not accessible to direct impingement of light from the light source and curving or faceting the reflecting surface to insure light impingement on these planar surfaces of the louver at angles greater than the desired cutoff angle, the thickness of the top portion of the longitudinal louver walls may be substantially reduced. As a result of the minimum number of curved walls, the open area through which the light rays may pass is increased with resultant increase in efficiency and without impairing the low brightness characteristics of the unit.

In the accompanying drawings in which are shown the details of a preferred embodiment of the invention, FIG. 1 is a cross sectional transverse view through a two-lamp fluorescent fixture formed in accordance with the teachings of this invention, FIG. 2 is a partial longitudinal section taken along line 2—2 of FIG. 1, and FIG. 3 is a perspective view of a segment of the louver utilized in the fixture of FIG. 1, made in accordance with the teachings of this invention.

Referring now to the drawings, where like numerals in the various figures will be employed to designate like parts, the lighting fixture 10, as shown in FIG. 1, is formed with a housing 11 in which is supported the conventional ballast transformer 12, and in the illustrated embodiment two fluorescent tubes or lamps 13.

Lamps 13 are mounted, preferably, each within its own reflector 15, and the reflector surface 15R immediately behind the lamp 13 is formed with a specular, diffuse, or mat coating, as desired. However, the remaining portions 15S" of the reflector must have a specular reflecting surface. Specular portion 15S" must extend upwards from the louver 25 at least to the point of intersection with a line b' drawn tangent to the lamp 13 on the same side as the reflector and at an angle C from the horizontal equal to the cutoff angle.

In the case of the lighting fixture herein, it is essential that no rays be emitted from the bottom face of the louver at an angle less than the cutoff angle.

As is well known, a fluorescent tubular light source emits light rays from its circumference in all directions. Therefore, when designing a reflector to control the light rays from a fluorescent tubular source, each and every point on the reflector has to be designed to control the two rays striking that point on the reflector which are tangent to the bottom and top half of the light source respectively and all the rays in between these two.

In the illustrative embodiment shown, each reflector has a mouth taken transversely at point X approximately five inches in width and a height rising from such mouth of approximately two and five-eighths inches.

The longitudinal axis of the lamp 13 is located approximately one and five-eighths inches above the mouth of the reflector midway between the sides thereof. The curvature of the wall surface of the reflector is such that all light rays from the lamp 13 including those tangent thereto, i.e., along line B, for example, will reflect from the wall surface of the reflector at an angle, with respect to the horizontal, greater than the cutoff angle, illustratively 45 degrees.

This requirement of a cutoff angle of 45 degrees describes one limiting curve of the reflector surface which may be defined as an integrated series of parabolas 15S" with axes A" inclined from the horizontal at the cutoff angle and having a focus F" for any given point P" on the curve located at the point of tangency of a line drawn between the point P" on the curve and tangent to the lower portion of the tubular light source 13. This reflector curve would cause all of the rays emanating from the lower portion of the circumference of the tubular light source to be reflected at an angle equal to the cutoff angle. It is obvious that all other rays emanating from the circumference of the tubular light source would be reflected by this reflector curve at an angle from the horizontal greater than the cutoff angle.

The opposing limiting curve for the reflector may be defined as a parabola 15S' with an axis A' inclined from the horizontal at 90 degrees and with the focal point F' at the center of the tubular light source. This configuration would be desirable for higher efficiency since a greater proportion of the rays from the reflector would pass through the open spaces of the louver grid without secondary reflection on the louver baffle surfaces. But other considerations may make it impractical to use this configuration.

Thus, each portion of the reflector curve lying on each side of the tubular light source shall be considered as lying between the two limiting curves defined above. Each specular reflector shall cover the area extending from the upper surface of the louver grid to the point of intersection of a tangent b' to the lower portion of the circumference of a tubular light source 13 lying at an angle from the horizontal equal to the cutoff angle C.

The louver 25 is secured in place across the open mouth of reflectors 15. Louver 25 is formed with a plurality of spaced transversely extending baffles 26 (e.g. transverse to the axis of lamps 13), as best shown in FIGS. 2 and 3, each having opposed specular surfaces. Each of the transverse baffles 26 is formed with a pair of opposed optically curved specular surfaces 27 which converges to a relatively thin edge surface 28. The curve of surfaces 27 is preferably parabolic with an axis lying at an angle from the horizontal equal to or greater than the desired cutoff angle and a focus F''' at the top of the facing adjacent baffle.

Arranged to extend substantially at right angles to transverse baffles 26, and parallel to the axis of lamp 13 are a plurality of longitudinal baffles each having opposed specular surfaces. Central (e.g. aligned with lamp 13) longitudinal baffle 29 has opposite surfaces thereof 30 and 31 of a substantially planar type extending in a direction substantially perpendicular to the plane of the lower surface of louver 25.

Arranged at a spaced distance on either side of central baffle 29 are two symmetrical longitudinal baffles 33 and 34 respectively (as shown in FIG. 3). The surfaces 32 of baffles 33 and 34 in the illustrated embodiment, closest to central baffle 29 are planar and illustratively inclined at an angle inwardly from the top of the baffle to the bottom thereof, so that the line of incidence of any light rays directly from lamp 13 impinging on such planar baffle surfaces will be at an angle to such baffle surface, whereby these rays will be reflected from the baffle surface at an angle from the horizontal equal to or greater than the cutoff angle, illustratively 45 degrees. The slight angularity illustrated, which may be up to 3 degrees depending on the material and molding process used, is to permit withdrawal from a mold.

In all cases the height and spacing of the baffles is such that the only light rays permitted past the baffles without reflection emerge at angles from the horizontal equal to or greater than the cutoff angle, illustratively 45 degrees.

In the illustrative embodiment, all the baffles are approximately .85 inch high. The spacing between adjacent longitudinal baffles is approximately .90 inch taken at the bottom of the louver and the spacing between adjacent transverse baffles is approximately 1.05 inches taken at the bottom of the louver. All the baffles are approximately .040 inch thick at their lower edges. The longitudinal baffles 29, 33 and 34 are approximately .090 inch thick at their upper edges and the longitudinal baffles 35, 36, positioned outwardly of baffles 33, 34, are approximately .140 inch thick at their upper edges. The transverse baffles 26 are all approximately .350 inch thick at their upper edges.

It is of course to be understood that the foregoing dimensions are not by way of limitation, but merely to illustrate one commercial embodiment of the invention.

Baffles 35 and 36 which are more remote from central baffle 29 may not be subject to being formed with a planar surface inclined to reflect light rays outside the cutoff angle. In this case the reflecting surfaces such as 37 and 38, are optically curved, illustratively substantially parabolic with an axis A inclined from the horizontal at an angle equal to or greater than the cutoff angle and having the focus F of the curvature of each of said surfaces approximately at the point of tangency of a line T drawn from the top edge P of the curved baffle and tangent to the lower portion of lamp 13.

As a result, any direct rays of light impinging upon these parabolically curved surfaces will be reflected therefrom in a direction parallel to or divergent from the axis of the parabola. Thus, if the axis A of the parabola 37a is arranged to extend along a line at an angle to the horizontal equal to or greater than the cutoff angle, it will be understood that any direct rays of light striking the parabolically curved surface will be reflected at an angle from the horizontal equal to or greater than the desired cutoff angle. The remote surfaces 39 and 40 of baffles 35 and 36 respectively which are only subject to impingement of rays reflected from reflector 15 may be made planar, with the curvature of the reflector surface cooperating with planar surfaces 39 and 40, to insure reflection of rays at angles with respect to the horizontal equal to or greater than the cutoff angle.

The surfaces 41 of baffles 33 and 34 remote from central baffle 29 are made substantially planar, extending in a direction substantially parallel to the planar surfaces 30 and 31 of central baffle 29. Though these planar surfaces 41 as well as surfaces 30, 31 of baffle 29 and surfaces 39, 40 of baffles 35, 36 may be made perpendicular to the bottom surface of the louver 25, since it is preferred to form these baffles by plastic molding techniques, it is also preferred to provide some slight degree of angularity to these surfaces of less than 3 degrees to implement removal from the mold.

Where the specular planar faces of the longitudinal baffles which face the reflector are inclined, as above desired, toward the reflector at an angle of $\theta$ from the verticle (for manufacturing purposes, illustratively 3°) then all rays leaving the reflector 15S'' must be at an angle from the horizontal which is equal to or greater than the cutoff angle (illustratively 45°), minus $2\theta$ (illustratively 6°) which equals 39° (illustratively). In this case the axes A'' of the integrated series of parabolas 15S'' will be inclined from the horizontal at the cutoff angle minus $2\theta$.

The operation of the fixture 10 employing the improved louver 25 is such that, assuming by way of example, a desired 45° cutoff angle C, the light emitted from the lamps 13 will pass through the louver into the illuminated area at some angle to the exposed surface of the louver equal to or greater than this desired cutoff angle. As shown in FIG. 1, rays emitted by lamp 13 and traveling towards the louver 25 at an angle less than the cutoff angle C will be reflected by the vertical blade surfaces so as to be emitted through the louver 25 at an angle greater than the desired cutoff angle as measured from the horizontal.

Considering ray $A^4$ emitted from the lamp 13 at some angle less than the cutoff angle, it will be seen that it strikes optically curved reflector surface 37 of baffle 35. The curvature of surface 37 is such that any ray emitted by the tubular light source 13 and striking surface 37 (which is the case with ray $A^4$) must be reflected along a line at an angle to the horizontal equal to or greater than the cutoff angle, since the limiting range of rays from the light source reflected from surface 37 is along the boundary $b$ of the cutoff angle. That this is so appears from the fact that the axis A of parabolically curved surface 37 extends parallel to or convergent to boundary $b$ and the only light impinging on the surface comes from or above the focus F of the parabola 37a, which focus is located at the point of tangency of a line drawn from the top edge P of curved baffle surface 37 and tangent to the lower portion of the tubular light source 13.

All rays, such as ray B emitted from the lamp 13 which do not strike the louver directly, but first impinge on reflector 15S'' will be reflected to the louver 25. Since the reflector is curved as above described, the ray B leaving the reflector will be reflected by the baffle surface 37 at an angle from the horizontal equal to or greater than the cutoff angle.

Rays striking the transverse baffles 26 which pass through the focus of the curve having its axis inclined at an angle equal to or greater than the cutoff angle and the focus of which is located at the top of a next adjacent baffle, will be reflected from the baffle surface at an angle substantially equal to or greater than the cutoff angle as more fully described in said Patent No. 2,971,083. All other rays striking baffle 26 will be reflected at angles greater than the cutoff angle.

It will be understood therefore that the rays which are emitted from the lamp 13 that will pass through the louver will do so at an angle to the horizontal equal to or greater than the desired cutoff angle.

It is apparent that only those baffles that receive direct rays from the lamp at an angle from the horizontal less than the cutoff angle need be curved. Since a louver baffle not having a curved surface may be made relatively thinner than one having curved surfaces, the utilization of planar surfaces permits the formation of a louver with relatively thin baffles, offering minimal interference with light transmission from the light source with resultant high efficiency and without loss of low brightness characteristics.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A lighting fixture comprising in combination a tubular light source, a reflector arranged in light reflecting relationship with respect to said light source, said reflector being optically curved, said curve being between a curve defined by an integrated series of parabolas, each having its axis inclined from the horizontal at the desired cutoff angle, and having a focus for any given point on the curve located at the point of tangency of a line drawn between the point on the curve and tangent to the lower portion of the tubular light source, and a curve defined by a parabola with an axis inclined from the horizontal at 90° and having its focal point at the center of the tubular light source, a specular louver coupled to said reflector and said light source to receive and pass the light reflected by said reflector and said light source, said louver comprising a plurality of spaced longitudinally extending specular baffles having specular reflecting surfaces on both sides, some of the inner surfaces of said longitudinally extending baffles adjacent opposed outer portions of the louver being optically curved to reflect light from said light source only at angles with respect to horizontal greater than a given angle, and some of the surfaces of said longitudinally extending baffles that are positioned inwardly of the baffles having the curved surfaces, being planar and cooperating with the surface of said reflector to reflect light only at angles with respect to horizontal greater than said given cutoff angle said louver also comprising a plurality of spaced baffles extending transversely of said longitudinal baffles.

2. A lighting fixture as in claim 1 in which said optically curved surfaces are formed only on the side of the baffle subject to direct impingement of light from said light source.

3. A lighting fixture as in claim 1 in which each of said longitudinally extending baffles that has an optically curved surface is formed with an opposed planar surface.

4. A lighting fixture as in claim 1 in which said longitudinal baffles lying immediately beneath said light source when the fixture is arranged to illuminate an area beneath it, are each formed with only planar surfaces.

5. A lighting fixture as in claim 1 in which some of the surfaces of the longitudinally extending planar baffles are inclined said desired cutoff angle being minus $2\theta$ where $\theta$ is the angle of inclination from the vertical of said inclined planar surfaces.

6. A lighting fixture as in claim 5 in which the reflecting surface of said reflector subtended by an arc measured from the top of said louver to the point of intersection with a line drawn tangent to the bottom surface of the light source on the same side as the reflector and at an angle from the horizontal equal to the cutoff angle minus 2θ, is formed with a specular surface.

7. A lighting fixture as in claim 1 in which said transversely spaced baffles having optically curved surfaces having a focus at the top of the next adjacent lateral wall and its axis lying along a line at the desired cutoff angle to the plane of the louver.

8. In a specular louver for use with an elongate light source, said louver having a grid of cells open to said light source, said cells having longitudinal walls extending substantially parallel to the axis of said light source, and transverse walls extending substantially perpendicular to the axis of said light source, said transverse walls having a side surface extending toward said light source in a plane having an optical curvature with an axis inclined from the horizontal at an angle equal to or greater than the cutoff angle and having its focus approximately at the top of the next adjacent transverse wall on the same side, some of said longitudinal walls having a side surface accessible to direct impingement of light from said light source lying in a plane having an optical curvature with an axis inclined at an angle from the horizontal equal to or greater than the desired cutoff angle and having a focus substantially at the point of tangency of a line drawn from the top edge of the side wall and tangent to the lower portion of the tubular light source, said longitudinal wall having is opposite surface not accessible to direct impingement of light from the light source, substantially planar and extending in a direction substantially perpendicular to the bottom surface of the louver.

9. A lighting fixture comprising in combination, an elongated specular reflector substantially curved in cross section, an elongated tubular light source positioned in the concavity of said reflector and extending substantially the length thereof, said reflector being optically curved, said curve being between a curve defined by an integrated series of parabolas, each having its axis inclined from the horizontal at the desired cutoff angle minus 2θ, where θ is the angle of inclination from the vertical of said inclined planar surfaces, and having a focus for any given point on the curve located at the point of tangency of a line drawn between the point on the curve and tangent to the lower portion of the tubular light source, and a curve defined by a parabola with an axis inclined from the horizontal at 90° and having its focal point at the center of the tubular light source, a specular louver supported by said reflector in light receiving relationship with respect to said light source and said reflector, said louver including a plurality of spaced longitudinally extending baffles, some of the inner surfaces of said baffles adjacent the opposed outer portions of the louver subject to impingement of light along a path lying at an angle to the plane of the louver less than a desired cutoff being optically curved to reflect the light from said surfaces at an angle equal to or greater than the cutoff angle, and the other surface of said longitudinal baffles.

References Cited by the Examiner

UNITED STATES PATENTS 1,989,578   1/1935   Barnes _____ 240—46.41
2,830,175   4/1958   Janhsen _____ 240—46.41

NORTON ANSHER, *Primary Examiner.*